United States Patent [19]

Kwon et al.

[11] Patent Number: 5,835,169
[45] Date of Patent: Nov. 10, 1998

[54] LIQUID CRYSTAL DISPLAY DEVICE OF THIN FILM TRANSISTOR AND FABRICATION METHOD THEREOF

[75] Inventors: Oh-Kyong Kwon; Koan-Yel Jeong, both of Seoul, Rep. of Korea

[73] Assignee: LG Semicon Co., Ltd., Cheongju, Rep. of Korea

[21] Appl. No.: 759,211

[22] Filed: Dec. 5, 1996

[30] Foreign Application Priority Data

Dec. 8, 1995 [KR] Rep. of Korea .................. 1995/47896

[51] Int. Cl.[6] ........................... G02F 1/136; G02F 1/1343
[52] U.S. Cl. ............................... 349/38; 349/43; 349/110; 349/143; 349/187
[58] Field of Search ............................ 349/44, 187, 38, 349/39, 110, 111, 42, 43, 143; 445/24; 257/59, 72; 439/48, 49, 50, 59, 60; 345/92

[56] References Cited

U.S. PATENT DOCUMENTS

| | | | |
|---|---|---|---|
| 4,986,637 | 1/1991 | Yamaguchi | 349/145 |
| 5,339,181 | 8/1994 | Kim et al. | 349/110 |
| 5,446,562 | 8/1995 | Sato | 349/110 |
| 5,459,596 | 10/1995 | Ueda et al. | 349/39 |
| 5,510,916 | 4/1996 | Takahashi | 349/110 |
| 5,576,859 | 11/1996 | Castleberry | 349/110 |

*Primary Examiner*—William L. Sikes
*Assistant Examiner*—Tai V. Duong
*Attorney, Agent, or Firm*—Fleshner & Kim

[57] ABSTRACT

In an LCD device of a thin film transistor which includes a thin film transistor having as a switching device gate electrode to which a driving voltage is applied and source/drain electrodes in which a channel is formed and thereby turned on when the driving voltage is applied to the gate electrode and has a data line spaced from the source electrode by a predetermined interval to be insulated therefrom and connected with the drain electrode, by interposing a storage electrode covering the data line and the gate line, located at a lower portion of a pixel electrode and formed of a conductive material capable of cutting off a light between the data line and a pixel electrode and between a gate line and the pixel electrode, the storage electrode cuts off the data line and the pixel electrode, and the gate line and the pixel electrode to minimize a parasitic capacitance generated therebetween, and accordingly, to prevent a cross talk caused by the parasitic capacitance, and thereby an aperture is increased without lowering a transparency rate of light, resulting in achieving a high degree of a picture quality.

5 Claims, 6 Drawing Sheets

LIQUID CRYSTAL DISPLAY DEVICE OF THIN FILM TRANSISTOR AND FABRICATION METHOD THEREOF

BACKGROUND OF THE INVENTION

1. Field of the Invention

The present invention relates to a liquid crystal display (hereinafter, called LCD) device of a thin film transistor and a fabrication method thereof which are capable of increasing an aperture ratio and improving a picture quality.

2. Description of the Prior Art

Conventionally, an LCD device of a thin film transistor includes an upper board and a lower board, between which a liquid crystal is sealed. The lower board includes a gate line for controlling an on/off of the thin film transistor, a data line for applying a picture signal, a storage electrode for enhancing a maintenance characteristic of a liquid crystal applying voltage, stabilizing a gray display and reducing a flicker and an after image effect, a black matrix for cutting off a light, and a pixel electrode. The upper board has a common electrode, a black matrix for cutting off a light and a RGB filter formed thereon.

To embody an excellent picture quality in designing a pixel of the LCD device of the thin film transistor, an aperture ratio which is a rate of an area which a light penetrates with respect to an entire area of the pixel must be increased, and a variation($\Delta V_p$) of the liquid crystal voltage generated by a cross talk caused by a capacitive coupling between the data line and the pixel electrode, a variation of the liquid crystal voltage caused by an occurrence of a leakage current generated due, to a resistant quality of an active layer, and a declination of the liquid crystal caused by the data line and the gate line must be minimized. This will now be described in more detail.

First, the aperture ratio is a rate of an area which a light penetrates with respect to an entire area of the pixel, and the elements which cannot transit a light among the elements comprising the LCD device of a thin film transistor include a thin film transistor, a gate line, a data line, a storage capacitor, and a black matrix. Therefore, to increase the aperture ratio, a whole area of the elements which reduces the aperture ratio must be decreased.

The method of reducing the area includes a method of decreasing a line width of the elements to reduce an aperture ratio and the spacing by designing a fabrication process of reducing a cross talk caused by a capacitive coupling and an alignment tolerance, a method that the portions of decreasing the aperture ratio are used overlappingly (for example, the black matrix used for an electrode of a storage capacitor), and a method that a material for the portions of dropping the aperture ratio is composed of a material which a light can penetrate.

Next, to reduce a variation($\Delta V_p$) of the liquid crystal voltage generated due to a cross talk caused by a capacitive coupling and a declination of the liquid crystal caused by the data line and the gate line, a method of widening a spacing of each element and of electrically cutting off each element may be suggested, but the former is not preferred because the aperture ratio is reduced thereby.

FIG. 1 is a plan view showing a construction of a pixel in an LCD device of a thin film transistor according to the conventional art. In the pixel, the storage capacitor including a common electrode 41 and a storage electrode 43 connected to the pixel electrode occupies a large area resulting in reducing the aperture ratio.

FIGS. 2A and 2B are cross-sectional views of the LCD device of the thin film transistor designed to be able to reduce the capacitive coupling between the data line and the pixel electrode by forming a storage capacitor using a black matrix to solve the reduction of the aperture ratio.

As shown in a layout in FIG. 2A, at an A' side, a drain electrode 61 and a source electrode 63 are formed to comprise a thin film transistor at both edges of an active layer 56 a predetermined portion of which is overlapped with a gate line 51, and at an A side, a data line 65 connected with the drain electrode 61 and a pixel electrode 59 a predetermined portion of which is overlapped with a predetermined portion of the source electrode 63 are formed to be cut off by a storage electrode 53.

FIG. 2B is a longitudinal cross-sectional view taken along the line AA' in FIG. 2A. As shown in this drawing, the LCD device of a thin film transistor includes a gate line 51 patterned after a metal material is deposited on a substrate (not illustrated), a storage electrode 53 patterned after a conductive material capable of screening a light is deposited on the substrate with a predetermined interval spaced from the gate electrode 51, a first insulating film 55 for insulating the gate electrode 51 and the storage electrode 53 from an upper structure, an active layer 56 patterned after an amorphous silicon (a-Si) is applied on the first insulating film 55 formed on the gate electrode, an anti-etching film 57 for preventing the active layer 56 from being etched in an etching process for forming the drain electrode and the source electrode 63 in a successive process by forming a photo etching mask on a second insulating film and etching the second insulating film after the second insulating film is deposited to have a predetermined thickness on the resultant surface after the formation of the active layer 56, a drain/source contact portions 58,58' formed at both edges of the active layer 56 by applying an amorphous silicon in which an impurity is doped on the entire resultant surface after the formation of the anti-etching film 57 and etching the resultant surface using a mask, a pixel electrode 59 a predetermined portion of which is overlapped with the storage electrode 53 by performing a patterning after depositing a predetermined thickness of a transparent conductive material (for example, ITO) on the entire resultant surface, a drain electrode 61 formed to be connected to the drain region 58 located at the left edge of the active layer 56 on the drawing by carrying out a patterning after depositing a conductive material on the entire resultant surface having the active layer 56 and the pixel electrode formed thereon, a source electrode 63 a predetermined portion of which is connected with both the source contact portion 58' located at the right edge of the active layer 56 and a predetermined portion of the pixel electrode 59, and a data line 65 formed to be spaced from the pixel electrode 59 by a predetermined interval by performing a patterning after depositing a conductive material on the first insulating film 55 formed on the storage electrode 53.

Here, as shown in FIG. 2A, the storage electrode 53 provides a capacitance due to an overlapping with the pixel electrode 59, and cuts off the pixel electrode 59 and the data line 65 by a predetermined portion, thereby resulting in reducing a parasitic capacitance generated therebetween.

However, in the case of an LCD device of a thin film transistor having the above construction, since a predetermined interval 70 must be maintained so that the data line 65 and the pixel electrode 59 may not be shorted, the aperture ratio is lowered in case of a small-sized pixel, and as shown in FIG. 2A, since the storage electrode 53 cannot completely cut off the data line 65 and the pixel electrode 53, a cross talk caused by the parasitic capacitance between the data line 65 and the pixel electrode 59 cannot be completely eliminated. Further, the cross talk generated due to the parasitic capacitance existing between the gate line 51 and the pixel electrode 59 is generated, thereby resulting in lowering a picture quality.

FIG. 3A is a plan view showing another LCD device of a thin film transistor having an ITO shield capacitor disposed therein according to the conventional art. The aperture ratio is much more improved by stacking a storage electrode and a pixel electrode on an upper portion of a data line and in particular forming the storage electrode using a transparent ITO.

Described in more detail, in FIG. 2A, the portion in which the pixel electrode 59 and the storage electrode 53 are overlapped are not included in an aperture area 69, but in FIG. 3, it can be seen that the aperture ratio is increased because the portion in which a pixel electrode 93 and a storage electrode 89 are overlapped is also used as an aperture area 97 which a light can penetrate.

That is, as shown in FIG. 3B, the LCD device includes a gate electrode 71 patterned after depositing a metal material on a substrate (not illustrated), a first insulating film 73 for insulating the gate electrode 71 from an upper structure, an active layer 75 patterned after an amorphous silicon (a-Si) is applied on the first insulating film 73 formed on the gate electrode 71, an anti-etching film 77 for preventing the active layer 75 from being etched in an etching process for forming the drain electrode and the source electrode 83 in a successive process by forming a photo etching mask on a second insulation film and etching the second insulation film using the mask after the second insulating film is deposited to have a predetermined thickness on the entire resultant surface after the formation of the active layer 75, a drain/source contact portion 79,79' formed at both edges of the active layer 75 by applying an amorphous silicon in which an impurity is doped on the entire surface of the resultant after the formation of the anti-etching film 77 and etching the same using a mask, a drain electrode 81 formed to be connected with the drain contact portion 79 located at the left edge of the active layer 75 on the drawing by carrying out a patterning using a predetermined mask after applying a conductive material on the entire resultant surface after the formation of the drain/source contact portions 79,79', a source electrode 83 formed to be connected with the source contact portion 79' located at the right edge of the active layer 75, a data line 85 formed at an A side to be spaced from the source electrode 83 by a predetermined interval, a third insulating film 87 for insulating the drain electrode 81, the source electrode 83 and the data line 85 from an upper structure, a storage electrode 89 formed at an upper portion of the data line 85 by performing a patterning after an ITO is deposited on the third insulating film 87 to have a predetermined thickness, a fourth insulating film 91 for insulating the storage electrode 89 from an upper structure, and a pixel electrode 93 formed to be both connected to the source electrode 83 and overlapped with the storage electrode 89 by depositing a predetermined thickness of an ITO after etching the third and fourth insulating films 87,91 and carrying out a patterning.

In case of the LCD device of a thin film transistor in FIG. 3, by forming the storage electrode composed of an ITO on the data line and stacking the pixel electrode composed of an ITO thereon, all the portions of the pixel electrode except for the portions overlapped with the data line and the source electrode are used as an aperture to increase an aperture ratio, but it results in lowering a transmittance ratio of a light since two ITO layers having a lower transmittance ratio of a light than the insulating film are deposited.

SUMMARY OF THE INVENTION

Accordingly, it is an object of the present invention to provide an improved LCD device of a thin film transistor which is capable of increasing an aperture ratio, preventing a cross talk and thereby eliminating a declination of a liquid crystal to improve a picture quality by forming a storage electrode using a conductive material capable of cutting off a light and completely cutting off a data line and a pixel electrode, and a gate line and the pixel electrode using the storage electrode.

It is another object of the present invention to provide an improved fabrication for an LCD device of a thin film transistor which is effectively capable of fabricating the LCD device of a thin film transistor.

To achieve the above object, in an LCD device of a thin film transistor which adopts as a switching device a thin film transistor having a gate electrode to which a driving voltage is applied and source/drain electrodes turned on by forming a channel when the driving voltage is applied to the gate electrode and includes a data line spaced from a source electrode by a predetermined interval to be insulated therefrom and formed to be connected with a drain electrode, the improvement further includes a storage electrode which completely covers the data line and the gate line and is located in a lower portion of a pixel electrode for cutting off a light between the data line and the pixel electrode and between the gate line and the pixel electrode.

To achieve another object, in an LCD device of a thin film transistor which adopts as a switching device a thin film transistor having a gate electrode to which a driving voltage is applied and source/drain electrodes turned on by forming a channel when the driving voltage is applied to the gate electrode and includes a data line spaced from a source electrode by a predetermined interval to be insulated therefrom and formed to be connected with a drain electrode, an improved fabrication method for an LCD device of a thin film transistor includes forming a first insulating film by depositing an insulating material on an entire surface of a structure having the source/drain electrodes and the data line formed thereon, forming a storage electrode on a portion corresponding to the gate electrode and on upper portions of the data line and the thin film transistor, forming a second insulating film by depositing an insulating material on the resultant entire surface, and forming a pixel electrode covering a predetermined area of the source region and the data line by selectively etching the first or second insulating film to form a contact portion so that a predetermined portion of the source electrode is exposed and to deposit an ITO on the resultant entire surface and patterning the ITO.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the accompanying drawings, the present invention will now be described in detail.

Figure 1:
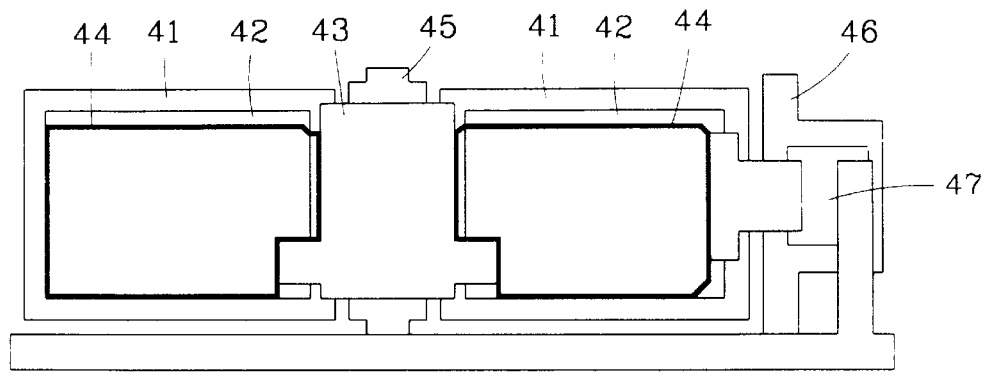
FIG. 1 is a plan view showing an LCD device of a thin film transistor according to the conventional art.
Figure 2A:
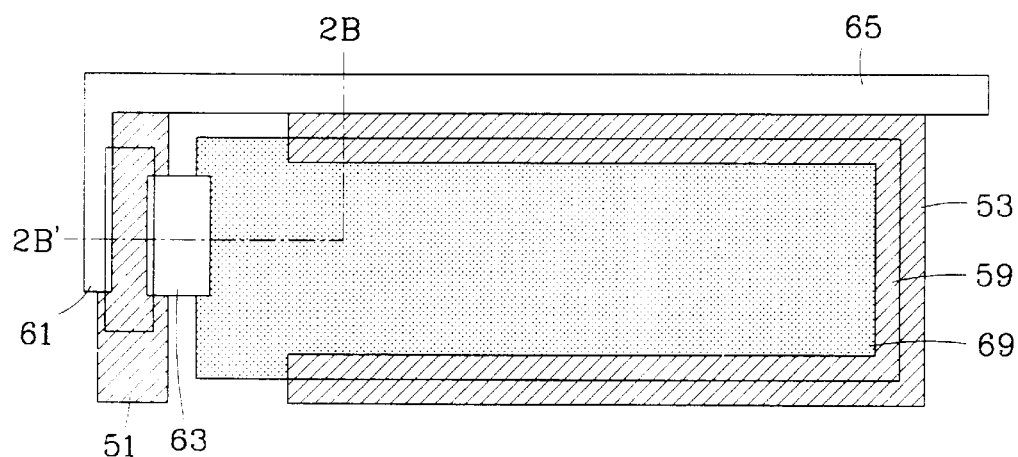
FIG. 2A is a plan view showing an LCD device of a thin film transistor having a shield capacitor provided according to the conventional art and FIG. 2B is a longitudinal cross-sectional view taken along the line AA' in FIG. 2A.
Figure 2B:
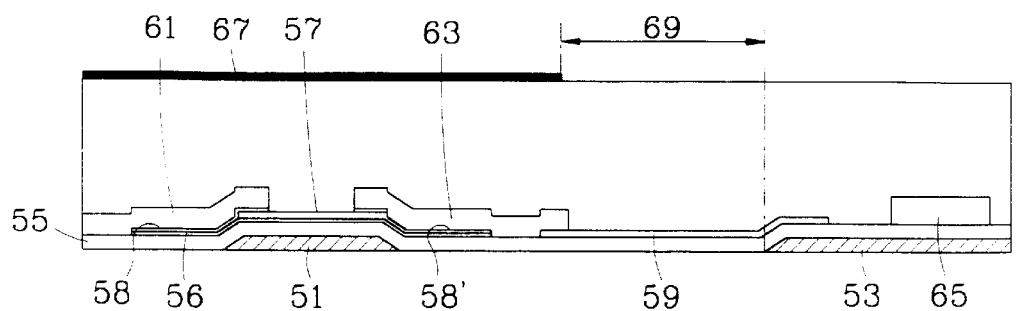
Figure 3A:
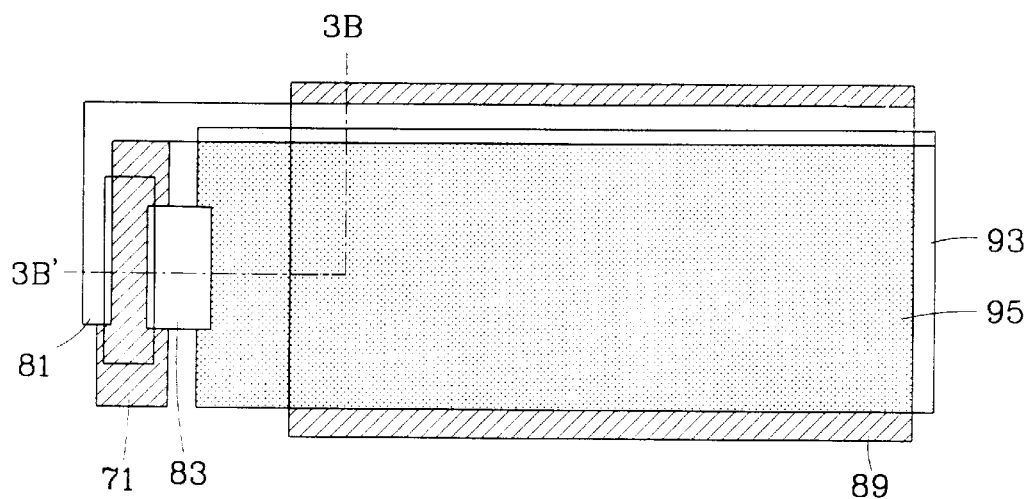
FIG. 3A is a plan view showing another LCD device of a thin film transistor having an ITO shield capacitor provided according to the conventional art and FIG. 3B is a longitudinal cross-sectional view taken along the line AA' in FIG. 3A.
Figure 3B:
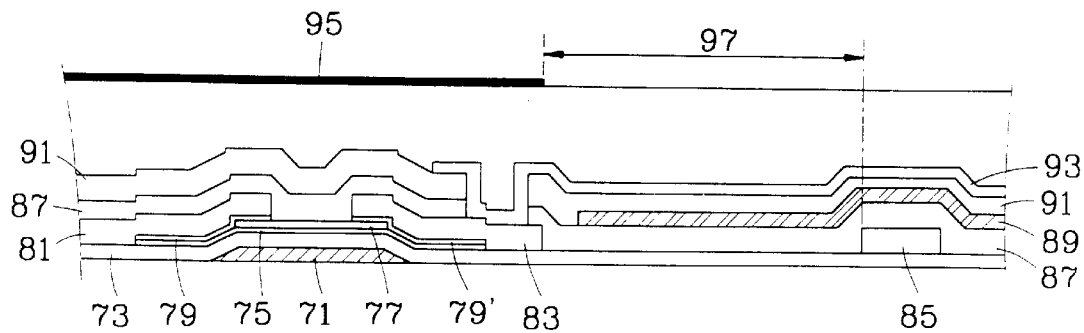
Figure 4A:
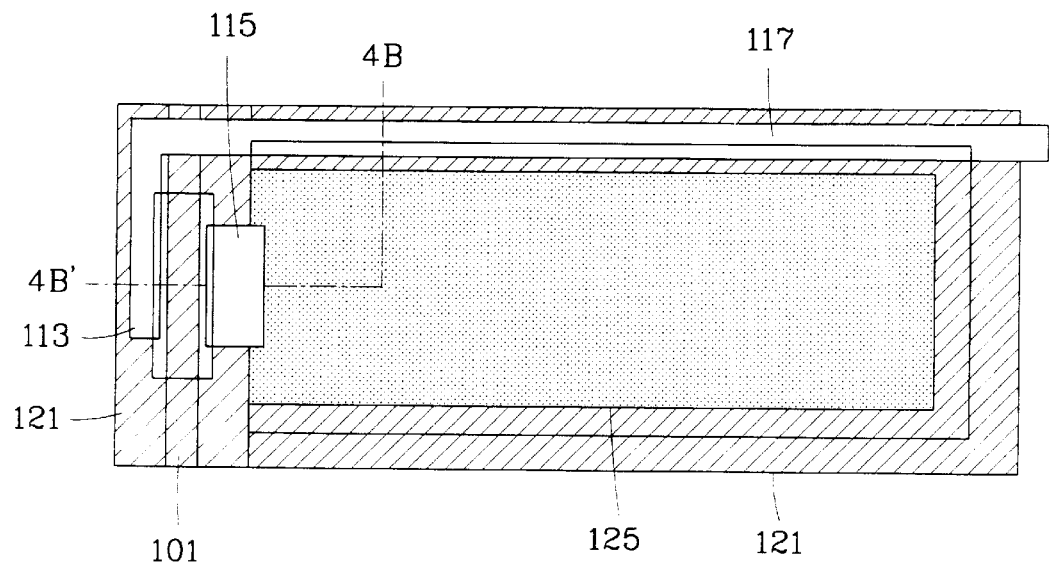
FIG. 4A is a plan view showing an LCD device of a thin film transistor according to the present invention and FIG. 4B is a longitudinal cross-sectional view taken along the line AA' in FIG. 4A.

As shown in FIG. 4A, an LCD device of a thin film transistor according to the present invention, in case of a lower board thereof, comprises a storage electrode 121 of a material capable of cutting off a light to use as a black matrix, and the storage electrode 121 completely cuts off a pixel electrode 125 and a data line 117, and the pixel electrode 125 and a gate line 101 to prevent a generation of a cross talk caused by a parasitic capacitance and eliminate a declination of a liquid crystal caused by the data line 117 and the gate line 101. An upper board thereof includes a common electrode and a color filter.

Figure 4B:
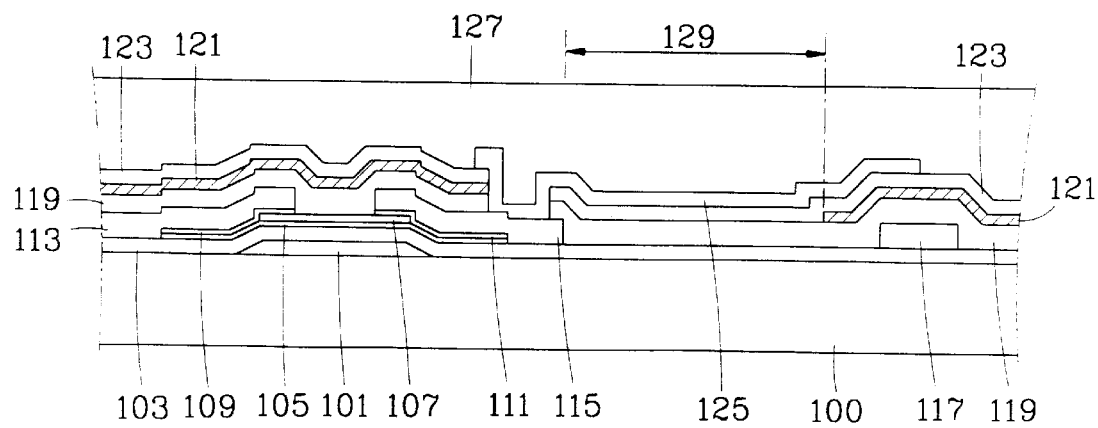

That is, as shown in FIG. 4B, a thin film transistor(TFT) side in the lower board includes a gate line 101, a first insulating film 103 for insulating the gate line 101 from an upper structure, an active layer 105 formed of an amorphous silicon or a polycrystalline silicon on the first insulating film 103 formed on the gate line 101, source/drain electrodes 113,114 formed on source/drain contact portions 109,109' formed at both edges of the active layer 105, a second insulating film 119 formed to cover the entire surface of the drain electrode 113 and a predetermined portion of the source electrode 115, the storage electrode 121 formed on the second insulating film 119, and a third insulating film 123 formed on an upper surface of the storage electrode 121. The rest portions except for the TFT include the data line 117 formed to be connected with the drain electrode 113, the second insulating film 119 formed on the data line 117, the storage electrode 121 formed on an upper portion of the data line 117 and an upper portion of the gate line 101 and the TFT, a third insulating film 123 formed on an entire surface of the structure including the second insulating film 119 and the storage electrode 121, and a pixel electrode 125 a predetermined portion of which is connected to the source electrode 115 and formed to cover a predetermined portion of the gate line 101 and the entire surface of the data line 117. Here, the storage electrode 121 also serves as a black matrix.

Referring to FIGS. 5A through 5J, a fabrication method for the LCD device of a thin film transistor will now be described in detail.

Figure 5A:
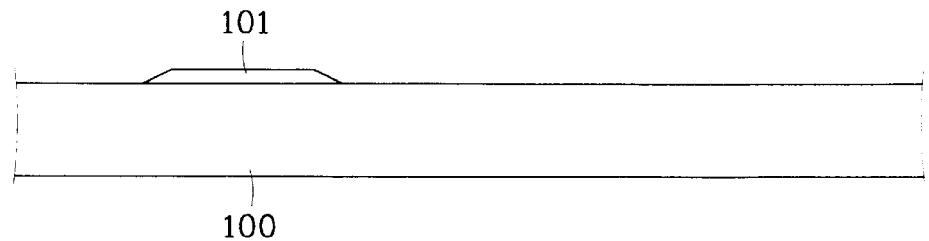
FIGS. 5A through 5J are longitudinal cross-sectional views showing a fabrication method for an LCD device of a thin film transistor according to the present invention.

First, as shown in FIG. 5A, a conductive material is deposited to have a predetermined thickness on a semiconductor substrate 100 composed of glass or quartz, a photoresist is coated thereon, and then the photoresist is patterned to form a photo etching mask. Then, a gate line 101 is formed by etching the conductive material using the photo etching mask.

Figure 5B:
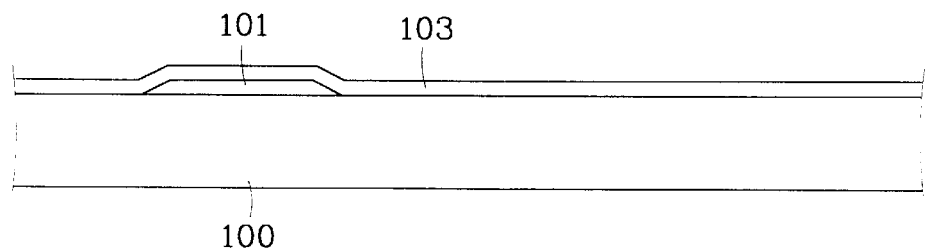
Figure 5C:
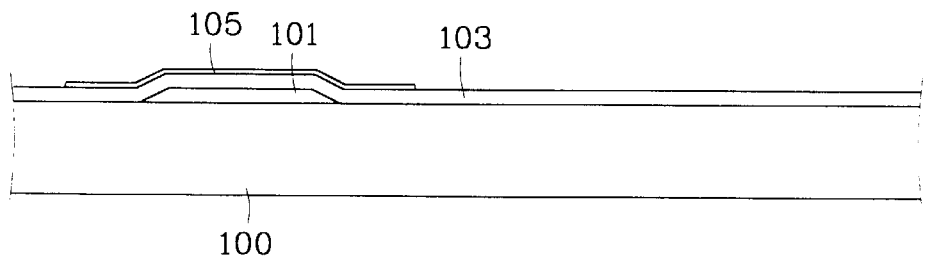

As shown in FIGS. 5B and 5C, a conductive material is deposited on the resultant entire surface after the formation of the gate line 101 to form the first insulating film 103, and then a polycrystalline silicon or an amorphous silicon is applied to have a predetermined thickness on the first insulating film 103. Then, in the same method as in FIG. 5A, a predetermined thickness of the photo etching mask is formed, and by etching the silicon using the mask, the active layer 105 is formed on the first insulating film 103 at a region of the gate line 101.

Figure 5D:
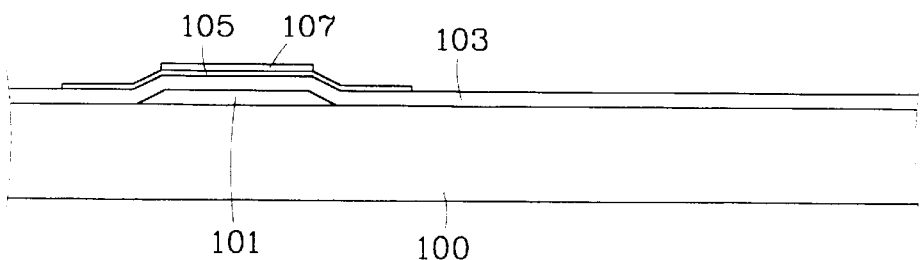

As shown in FIG. 5D, after the formation of the active layer 105, a predetermined thickness of a silicon nitride (SiN) is deposited to serve as an insulating material on a entire resultant surface, and a predetermined photo etching mask is formed on the silicon nitride layer. By etching the silicon nitride using the mask, in an etching process of forming the drain electrode 113 and the source electrode 115 in a successive process, an anti-etching film 107 is formed to prevent the active layer 105 from being etched.

Figure 5E:
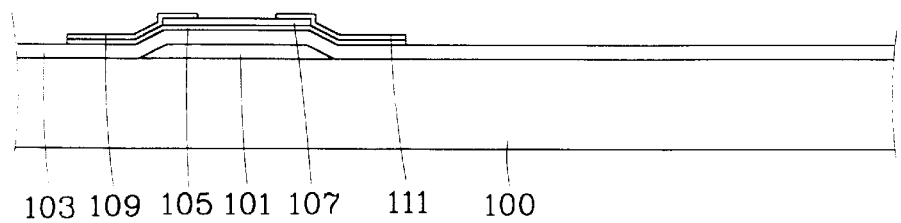

As shown in FIG. 5E, after the formation of the anti-etching film 107, by applying a silicon in which an impurity is doped on the resultant entire surface and etching the silicon using a predetermined photo etching mask, the drain/source contact portions 109,109' are formed to be contact with both edges of the active layer 105.

Figure 5F:
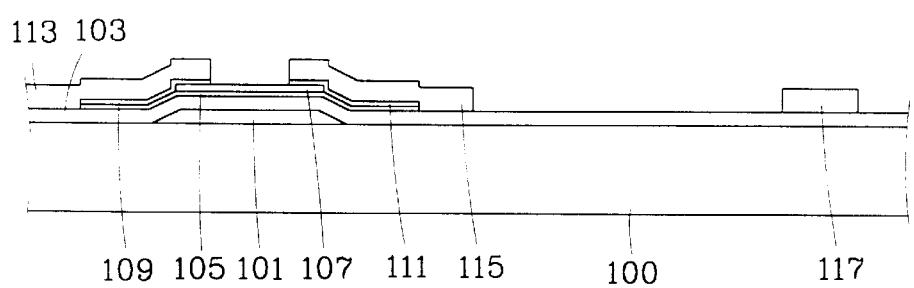

As shown in FIG. 5F, drain/source electrodes 113,115 which are respectively contact with the edges of the active layer 105 and the drain/source contact portions 109,109' and a data line 117 spaced from the source electrode 115 by a predetermined interval are formed by applying a conductive material on the resultant entire surface and patterning the deposited conductive material layer using a predetermined photo etching mask, after the formation of the drain/source contact portions 109,109'.

Figure 5G:
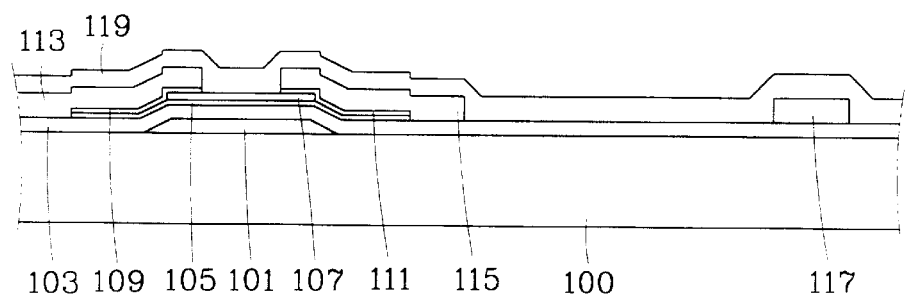
Figure 5H:
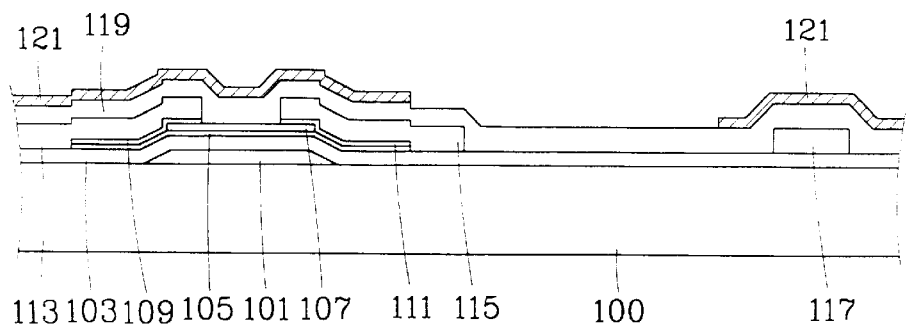

As shown in FIGS. 5G and 5H, after the formation of the data line 117, the second insulating film 119 is formed by depositing an insulating material on the resultant entire surface to have a predetermined thickness. Then, a conductive material capable of cutting off a light is deposited on the second insulating film 119 to form a photo etching mask on the conductive material. The storage electrode 121 is formed on a portion corresponding to the gate line 101 and on the second insulating film 119 and the TFT located correspondingly to the data line 117, by etching the deposited conductive material layer using the mask.

Figure 5I:
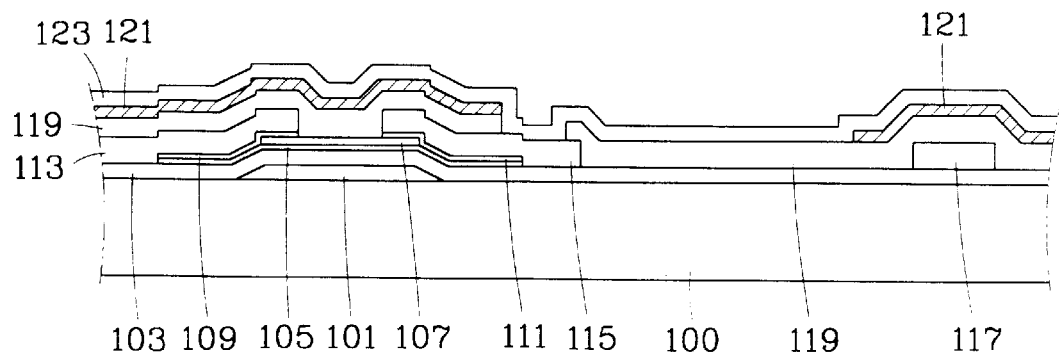
Figure 5J:
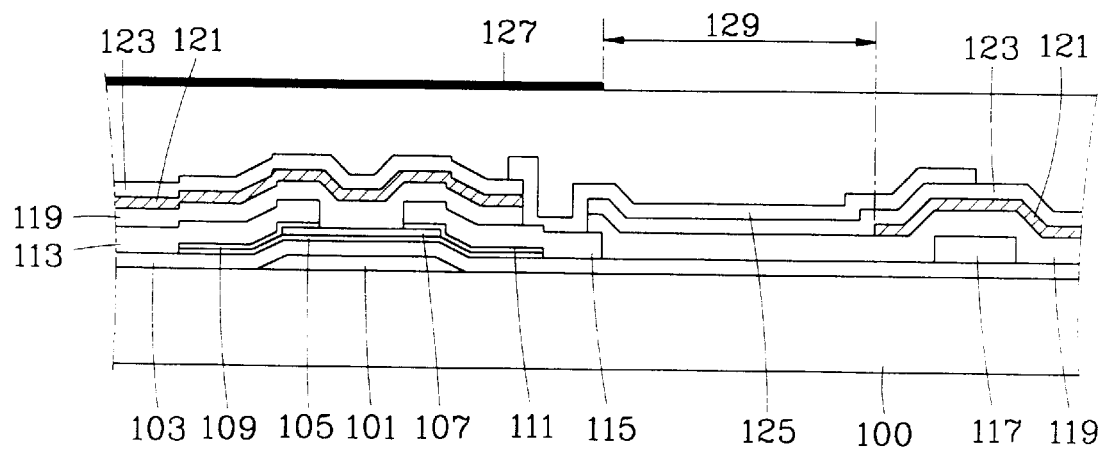

As shown in FIGS. 5I and 5J, after the formation of the storage electrode 121, the third insulating material 123 is formed by depositing an insulating material to have a predetermined thickness on the resultant entire surface, and a predetermined thickness of the photo etching mask is formed on the third insulating film 123. By selectively etching the third or second insulating material 123 or 119 using the mask, a contact portion is formed so that a predetermined portion of the source region 115 is exposed, and ITO is deposited on the resultant entire surface to form the pixel electrode 125 in contact with the source electrode 115 through the contact portion, covering a predetermined portion of the gate line 101 and the data line 117.

The present invention can be adopted to a top gate type (TG) as well as a bottom gate type (BG) which is shown on the drawings according to the present invention, as shown in FIGS. 5A through 5J.

As described in detail above, according to the present invention, by interposing a storage electrode formed of a conductive material capable of cutting off a light between the data line and the pixel electrode and between the gate line and the pixel electrode, the storage electrode completely cuts off the data line and the pixel electrode, and the gate line and the pixel electrode to minimize a parasitic capacitance generated therebetween, thereby to prevent a cross talk caused by the parasitic capacitance, and by increasing an aperture ratio without lowering a transmittance ratio of a light, a high degree of picture quality can be achieved.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for making a display device having matrix type pixel, comprising:

forming a switching device having a control electrode and first and second electrodes;

forming a first line spaced from the first electrode by a predetermined area and coupled to the second electrode;

forming a first insulating film by depositing an insulating material on a surface of the switching device including the first and second electrodes and the first line formed thereon;

forming a storage electrode on a portion corresponding to the control electrode and on upper portions of the first line and the switching device;

forming a second insulating film by depositing an insulating material; and forming a substantially rectangular pixel electrode covering a predetermined area of a first electrode region and the first line by selectively etching the first or second insulating film to form a contact portion so that a predetermined portion of the first electrode is exposed, wherein the storage electrode cuts off a light between the first line and the pixel electrode and between the control electrode and the pixel electrode; and depositing and patterning an ITO, wherein the switching device does not impinge on a neighboring pixel electrode.

2. The method of claim 1, wherein the switching device is located along one end of the pixel electrode.

3. The method of claim 1, wherein the switching is located in the middle of one end of the pixel electrode.

4. The method of claim 1, wherein the switching device is not located in a corner of the pixel electrode.

5. The method of claim 1, further comprising a second line coupled to the control electrode, wherein the control, first, and second electrodes are respectively gate, source and drain electrodes, and wherein the first line is a data line, the second line is a gate line and the switching device is a thin film transistor positioned along the gate line.

* * * * *